US011100903B2

(12) United States Patent
Kudo

(10) Patent No.: US 11,100,903 B2
(45) Date of Patent: Aug. 24, 2021

(54) ELECTRONIC DEVICE AND CONTROL METHOD FOR CONTROLLING A DISPLAY RANGE ON A DISPLAY

(71) Applicant: CANON KABUSHIKI KAISHA, Tokyo (JP)

(72) Inventor: Seiji Kudo, Zushi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/592,035

(22) Filed: Oct. 3, 2019

(65) Prior Publication Data
US 2020/0035208 A1 Jan. 30, 2020

Related U.S. Application Data

(63) Continuation of application No. PCT/JP2018/002464, filed on Jan. 26, 2018.

(30) Foreign Application Priority Data

Apr. 4, 2017 (JP) .............................. JP2017-074483
Apr. 4, 2017 (JP) .............................. JP2017-074496

(51) Int. Cl.
G09G 5/38 (2006.01)
G09G 5/377 (2006.01)

(52) U.S. Cl.
CPC ............... *G09G 5/38* (2013.01); *G09G 5/377* (2013.01); *G09G 2340/0464* (2013.01);
(Continued)

(58) Field of Classification Search
CPC .. H04N 5/23238; H04N 21/431; G09G 3/001; G09G 5/00; G09G 5/377;
(Continued)

(56) References Cited

U.S. PATENT DOCUMENTS 5,959,597 A 9/1999 Yamada et al.
9,736,370 B2 * 8/2017 Barcovschi ...... H04N 5/232933
(Continued)

FOREIGN PATENT DOCUMENTS

CN 104168407 A 11/2014
CN 104280884 A 1/2015
(Continued)

OTHER PUBLICATIONS

PCT/IB/338 (PCT Notification of Transmittal of Translation of the International Preliminary Report on Patentability).
(Continued)

*Primary Examiner* — Jacinta M Crawford
(74) *Attorney, Agent, or Firm* — Cowan, Liebowitz & Latman, P.C.

(57) ABSTRACT

An electronic device according to the present invention includes at least one memory and at least one processor which function as: a display controlling unit configured to perform control so as to display a range of a part of a VR content as a display range on a display, and configured to be able to change a position of the display range, wherein the display controlling unit performs control so that, when a part of a VR content that is a display target is a non-video range, a range of a part of the VR content is displayed as a display range and a guide indicating a positional relationship between a video range and the non-video range of the VR content is displayed.

23 Claims, 6 Drawing Sheets

(52) U.S. Cl.
    CPC ............... *G09G 2340/0492* (2013.01); *G09G 2340/125* (2013.01); *G09G 2354/00* (2013.01)

(58) Field of Classification Search
    CPC ............. G09G 5/38; G09G 2340/0464; G09G 2340/0492; G09G 2340/125; G09G 2354/00; G06F 3/01; G06F 3/147
    USPC .......................................................... 345/634
    See application file for complete search history.

(56) References Cited

U.S. PATENT DOCUMENTS

| | | | |
|---|---|---|---|
| 2013/0234914 A1 | 9/2013 | Fujimaki | |
| 2014/0333718 A1* | 11/2014 | Chang ................. | H04N 5/23238 348/36 |
| 2017/0018217 A1 | 1/2017 | Ogino et al. | |
| 2017/0169621 A1 | 6/2017 | Kawamoto et al. | |

FOREIGN PATENT DOCUMENTS

| | | |
|---|---|---|
| CN | 104394451 A | 3/2015 |
| CN | 104731337 A | 6/2015 |
| CN | 105229720 A | 1/2016 |
| CN | 105988219 A | 10/2016 |
| CN | 106303405 A | 1/2017 |
| JP | 2016-013272 A | 1/2016 |
| JP | 3796776 B2 | 7/2016 |
| JP | 2017-022665 A | 1/2017 |
| WO | 2016/013272 A1 | 1/2016 |

OTHER PUBLICATIONS

PCT/IB/373 (PCT International Preliminary Report on Patentability).
PCT/ISA/237 (PCT Written Opinion of the International Searching Authority).
The above foreign documents were cited in the International Search Report of International International Search Report of the corresponding International Application No. PCT/JP2018/002464 dated Apr. 17, 2018.
The above documents were cited in a Jan. 28, 2021 Chinese Office Action, which is enclosed with an English Translation, that issued in Chinese Patent Application No. 201880023865.6.

* cited by examiner

ELECTRONIC DEVICE AND CONTROL METHOD FOR CONTROLLING A DISPLAY RANGE ON A DISPLAY

CROSS-REFERENCE TO RELATED APPLICATIONS

This application is a Continuation of International Patent Application No. PCT/JP2018/002464, filed Jan. 26, 2018, which claims the benefit of Japanese Patent Application No. 2017-074483, filed Apr. 4, 2017, and Japanese Patent Application No. 2017-074496, filed Apr. 4, 2017, which are hereby incorporated by reference herein in their entirety.

BACKGROUND OF THE INVENTION

Field of the Invention

The present invention relates to an electronic device, a control method of the electronic device, a program, and a storage medium, and particularly to a control method for displaying an image having a wide video range.

Background Art

In recent years, image capturing apparatuses capable of photographing an image containing a video that is wider than a human viewing angle such as an omnidirectional image or a fully celestial image are becoming popular. Methods are also known for performing display with a high sense of immersion or a high sense of realism by displaying a part of an image containing such a wide-range video on a display and changing a range of the video to be displayed on the display (a display range) so as to follow a change in an orientation of an image capturing apparatus.

PTL 1 proposes a video display system which, when viewing a video captured by a fully celestial camera with a head mounted display (HMD), detects a line-of-sight direction of a user and displays video data of a predetermined range in accordance with the line-of-sight direction.

When generating a video content to be displayed on an HMD or the like, various photographic angles of view may be used by an image capturing apparatus upon photography of the content and the angle of view may be changed when editing the content. Therefore, the video content may not contain video of an entire circumference of 360 degrees (omnidirectional) and may only contain video in a range of a part thereof (for example, 120 vertical degrees or 220 horizontal degrees). Since a valid video range of such a video content is not continuous through 360 degrees of the circumference, ends are present in a range in which the video is present (the valid video range) and a region exceeding the ends constitutes a non-video range. Conceivable methods of displaying a part of such a video content as a display range include moving a display range beyond one end of a valid video range, displaying a non-video range in the process of the movement, and displaying the valid video range on a side of another end when the display range is further moved in a same direction.

However, when displaying the non-video range beyond the one end of the valid video range, with respect to a portion corresponding to the non-video range, it is difficult for a user to discern whether a video is not being displayed because the video is contained in the non-video range or a video is not being displayed due to some kind of abnormality in a display process. In addition, when the non-video range beyond the one end of the valid video range is to be hidden, it is difficult for a user to discern whether a display range is not changed because an end of the valid video range has been reached or because some kind of abnormality in the display process has occurred.

In a video content containing a video with a wider range than a human viewing angle, a non-video range is often positioned to the rear or directly underneath when a center of the valid video range is assumed to be in front and positioned in a direction in which it is difficult for a user directly facing the center of the valid video range to direct his or her line of sight. However, as described above, in order to display the valid video range at the other end after displaying the non-video range beyond the one end, the non-video range must be displayed for a long period of time if the non-video range is wide. Displaying the non-video range for a long period of time creates a problem in that a posture at which it is difficult to direct a line of sight must be assumed for a long period of time and a problem in that it is difficult to discern which range is being displayed. Rather, moving the display range in an opposite direction and displaying the valid video range at the other end may make it easier to discern which range is being displayed and, at the same time, may be carried out more easily.

CITATION LIST

Patent Literature

PTL 1 Japanese Patent Application Laid-open No. 2017-22665

SUMMARY OF THE INVENTION

In consideration thereof, the present invention provides an electronic device, a control method of the electronic device, a program, and a storage medium which enable a more suitable display to be performed when a content having a wide video range contains a non-video range.

An electronic device according to the present invention includes at least one memory and at least one processor which function as: a display controlling unit configured to perform control so as to display a range of a part of a VR content as a display range on a display, and configured to be able to change a position of the display range, wherein the display controlling unit performs control so that, when a part of a VR content that is a display target is a non-video range, a range of a part of the VR content is displayed as a display range and a guide indicating a positional relationship between a video range and the non-video range of the VR content is displayed.

Further features of the present invention will become apparent from the following description of exemplary embodiments with reference to the attached drawings.

DESCRIPTION OF THE EMBODIMENTS

Figure 1:
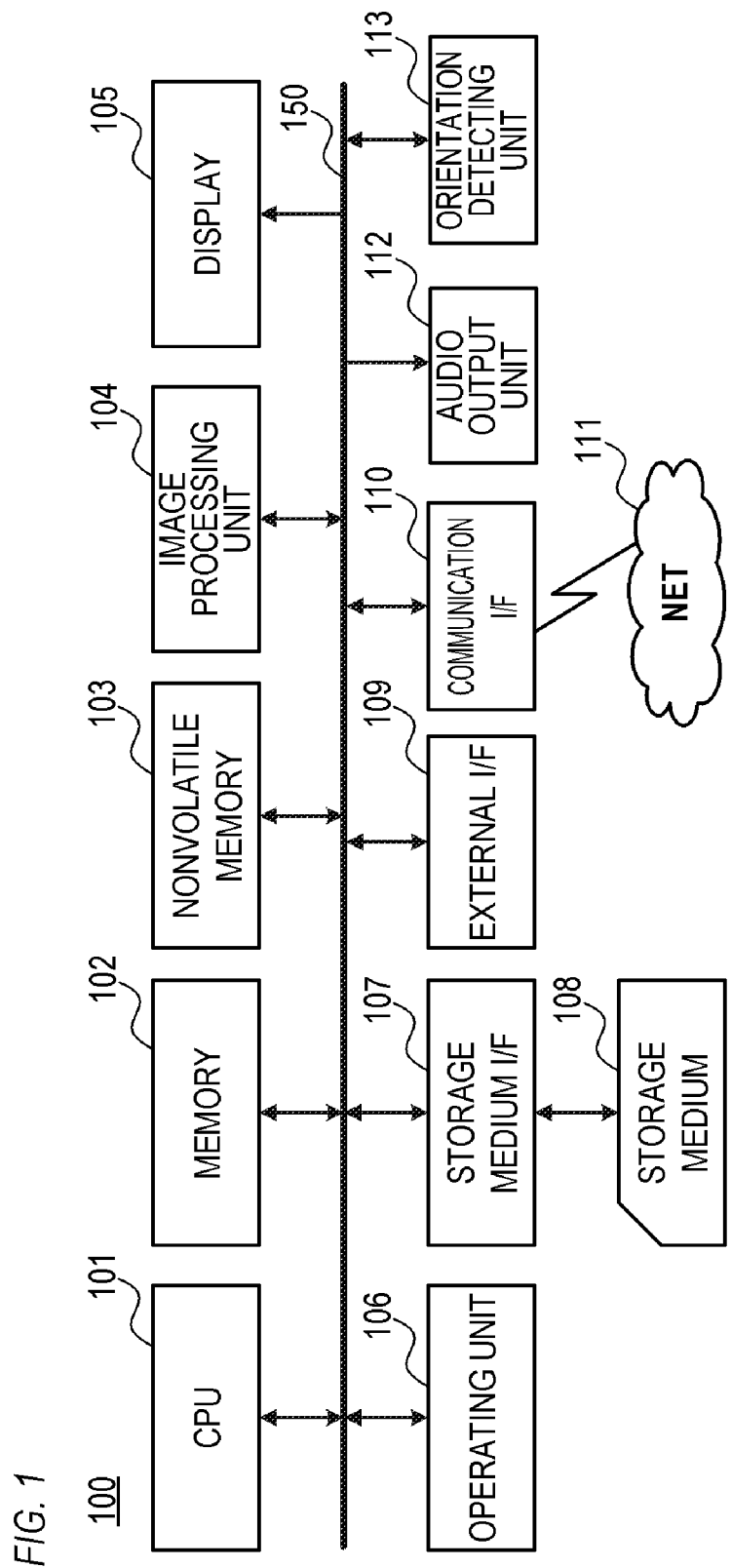
FIG. 1 is a configuration block diagram of an electronic device 100.

FIG. 1 shows an example of a configuration of an electronic device 100 as an example of a display control apparatus to which the present invention is applicable. The electronic device 100 can be configured using a display apparatus such as a smartphone.

In FIG. 1, a CPU 101, a memory 102, a nonvolatile memory 103, an image processing unit 104, a display 105, an operating unit 106, a storage medium I/F 107, an external I/F 109, and a communication I/F 110 are connected to an internal bus 150. In addition, an audio output unit 112 and an orientation detecting unit 113 are also connected to the internal bus 150. The respective units connected to the internal bus 150 are configured to be capable of exchanging data with one another via the internal bus 150.

The CPU 101 is a control unit which controls the entire electronic device 100 and is constituted by at least one processor. The memory 102 is constituted by, for example, a RAM (such as a volatile memory using a semiconductor element). The CPU 101 controls the respective units of the electronic device 10) by, for example, using the memory 102 as a work memory in accordance with a program stored in the nonvolatile memory 103. The nonvolatile memory 103 stores image data and audio data, other data, various programs that enable the CPU 101 to operate, and the like. The nonvolatile memory 103 is constituted by, for example, a flash memory or a ROM.

Under control by the CPU 101, the image processing unit 104 performs various image processing on images stored in the nonvolatile memory 103 or the storage medium 108, video signals acquired via the external I/F 109, images acquired via the communication I/F 110, and the like. Image processing performed by the image processing unit 104 includes an A/D conversion process and a D/A conversion process as well as an encoding process, a compression process, a decoding process, an enlargement/reduction process (resizing), a noise reduction process, a color conversion process, and the like of image data. The image processing unit 104 also performs various image processing such as panoramic development, a mapping process, and conversion of omnidirectional images or wide-range images having data of a wide range if not omnidirectional. The image processing unit 104 may be constituted by a dedicated circuit block for performing specific image processing. In addition, depending on a type of image processing, the CPU 101 may perform the image processing in accordance with a program without using the image processing unit 104.

The display 105 displays images, a GUI (Graphical User Interface) screen constituting a GUI, and the like under control by the CPU 101. The CPU 101 controls the respective units of the electronic device 100 so as to generate a display control signal in accordance with the program and to generate a video signal to be displayed on the display 105 and output the video signal to the display 105. The display 105 displays a video based on an output video signal. Alternatively, components of the electronic device 100 itself may be limited to up to an interface for outputting a video signal to be displayed by the display 105, and the display 105 may be constituted by an external monitor (such as a television).

The operating unit 106 is an input device for accepting a user operation of which examples include a character information input device such as a keyboard, a pointing device such as a mouse or a touch panel, a button, a dial, a joystick, a touch sensor, and a touch pad. In this case, a touch panel refers to an input device which is planarly configured so as to overlap with the display 105 and to output coordinate information in accordance with a touched position.

The storage medium I/F 107 is configured such that a storage medium 108 such as a memory card, a CD, or a DVD is mountable thereto and, under the control of the CPU 101, the storage medium I/F 107 reads data from and writes data to the mounted storage medium 108. The external I/F 109 is an interface to be connected to an external device using a wired cable or in a wireless manner to perform input and output of video signals and audio signals. The communication I/F 110 is an interface for communicating with an external device, the Internet 111, and the like to transmit and receive various types of data such as files and commands.

The audio output unit 112 outputs audio of moving images and music data, keyboard clicks, ring tones, various notification sounds, and the like. While it is assumed that the audio output unit 112 includes an audio output terminal 112a to which an earphone or the like is to be connected and a speaker 112b, alternatively, audio output may be performed by radio communication or the like.

The orientation detecting unit 113 detects an orientation of the electronic device 100 relative to a direction of gravitational force. Based on an orientation detected by the orientation detecting unit 113, a determination can be made as to whether the electronic device 100 is being held horizontally, held vertically, pointed upward, pointed downward, or assuming an oblique orientation. As the orientation detecting unit 113, at least one of an acceleration sensor, a gyro sensor, a geomagnetic sensor, an orientation sensor, and the like can be used or a plurality of the sensors can be used in combination.

The operating unit 106 includes a touch panel 106a. The CPU 101 is capable of detecting the following operations with respect to the touch panel 106a or the following states of the touch panel 106a.

A state where a finger or a stylus previously not in touch with the touch panel 106a newly touches the touch panel 106a or, in other words, a start of a touch (hereinafter referred to as a touch-down)

A state where the touch panel 106a is being touched by a finger or a stylus (hereinafter referred to as a touch-on)

A state where a finger or a stylus is moving while in touch with the touch panel 106a (hereinafter referred to as a touch-move)

A state where a finger or a stylus previously in touch with the touch panel 106a separates from the touch panel 106a or, in other words, an end of a touch (hereinafter referred to as a touch-up)

A state where nothing is touching the touch panel 106a (hereinafter referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off is detected upon detection of a touch-up of all of the fingers or a stylus previously in touch.

The CPU 101 is notified of the operations or the states described above as well as a position coordinate where a finger or a stylus touches the touch panel 106a through an internal bus and, based on the notified information, the CPU 101 determines what kind of operation (touch operation) has been performed on the touch panel 106a. With respect to a touch-move, a movement direction of a finger or a stylus moving on the touch panel 106a can be determined for each of a vertical component and a horizontal component on the touch panel 106a based on a change in the position coordinate. When a touch-move of a predetermined distance or more is detected, it is determined that a slide operation has been performed. An operation involving quickly moving a finger on the touch panel 106a for a certain distance while keeping the finger in touch with the touch panel 106a and then releasing the finger is referred to as a flick. In other words, a flick is an operation in which a finger quickly traces the touch panel 106a as though flicking on the touch panel 106a. A determination that a flick has been performed can be made (a determination that a flick has occurred following a slide operation can be made) when a detection of a touch-move of a predetermined distance or more at a predetermined speed or more is followed by a detection of a touch-up. Furthermore, a touch operation involving touching a plurality of locations (for example, two points) at the same time and bringing the respective touch positions close to each other is referred to as a pinch-in while a touch operation in which the respective touch positions are distanced from each other is referred to as a pinch-out. A pinch-out and a pinch-in are collectively referred to as a pinch operation (or, simply, a pinch). As the touch panel 106a, a touch panel adopting any of various systems including a resistive film system, a capacitance system, a surface acoustic wave system, an infrared system, an electromagnetic induction system, an image recognition system, and an optical sensor system may be used. Any of a system in which a touch is detected when contact is made with the touch panel and a system in which a touch is detected when a finger or a stylus approaches the touch panel may be adopted.

Figure 2:
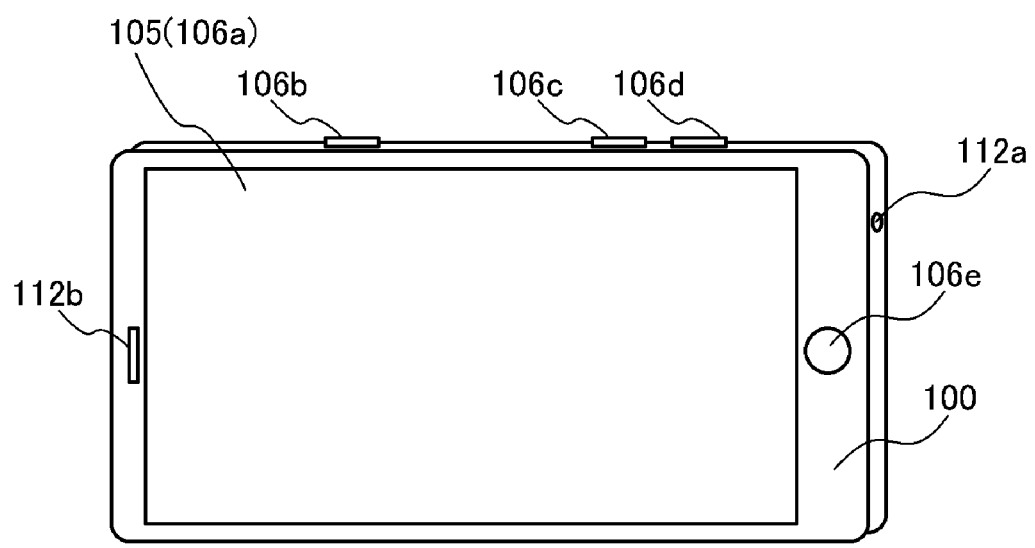
FIG. 2 is an external view of the electronic device 100.

FIG. 2 represents an example of an external view of the electronic device 100. The display 105 is a display unit which displays images and various types of information. The display 105 is integrally constructed with the touch panel 106a as described above and is configured to be capable of detecting a touch operation on a display surface of the display 105. As illustrated, the operating unit 106 includes operating units 106b, 106c, 106d, and 106e. The operating unit 106b is a power supply button for accepting an operation to switch between turning a power supply of the electronic device 100 on and off. The operating unit 106c and the operating unit 106d are volume buttons for increasing and reducing a volume of audio output from the audio output unit 112. The operating unit 106e is a home button for causing a home screen to be displayed on the display 105.

Figure 3:
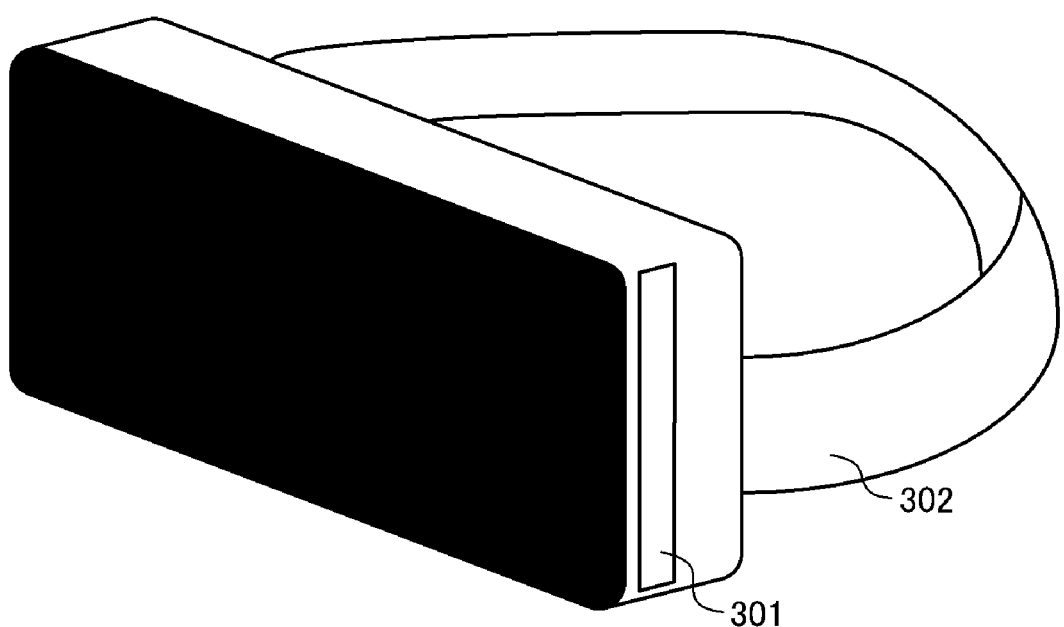
FIG. 3 is an external view of VR goggles to which the electronic device 100 is mountable.

FIG. 3 is an external view of VR goggles (a head mount adapter) to which the electronic device 100 is mountable. By mounting the electronic device 100 to the VR goggles, the electronic device 100 can also be used as a head mounted display. An insertion opening 301 is an insertion opening to which the electronic device 100 is to be inserted. The entire electronic device 100 can be inserted into the VR goggles by orienting the display surface of the display 105 toward a side of a headband 302 for fixing the VR goggles to the head of a user (in other words, toward the user). By wearing the VR goggles to which the electronic device 100 has been mounted in this manner, the user can view the display 105 of the electronic device 100 in a state where the VR goggles are worn on the user's head without having to manually hold the electronic device 100. In this case, when the user moves his or her head or entire body, an orientation of the electronic device 100 also changes. The orientation detecting unit 113 detects a change in orientation of the electronic device 100 at this point, and the CPU 101 performs a VR display process (to be described later) on the basis of the change in orientation. In this case, the detection of the orientation of the electronic device 100 by the orientation detecting unit 113 is equivalent to a detection of an orientation of the head of the user (a direction in which a line of sight of the user is oriented).

The electronic device 100 is capable of performing VR display of a VR image (a VR content) on the display 105.

A VR image is assumed to be an image of which VR display can be performed. VR images are assumed to include an omnidirectional image (a fully celestial image) captured by an omnidirectional camera (a fully celestial camera) and a panoramic image having a wider video range (a valid video range) than a display range that can be displayed at one time on display unit. In addition to images photographed by a camera, it is assumed that VR images (VR contents) even include images created using computer graphics (CG) as long as the VR display of the images can be performed. VR images include moving images and live view images (images acquired approximately in real time from a camera) in addition to still images. A VR image has a maximum video range (a valid video range) corresponding to a visual field of 360 degrees in a vertical direction (a vertical angle, an angle from a zenith, an elevation, a depression angle, or an elevation angle) and 360 degrees in a horizontal direction (a horizontal angle or an azimuth). In addition, it is assumed that VR images include images with a wide angle of view (a visual field range) which is wider than an angle of view that can be photographed by an ordinary camera or images with a wider video range (a valid video range) than a display range that can be displayed at one time on display unit even when the visual field of the images is less than 360 degrees in the vertical direction and less than 360 degrees in the horizontal direction. For example, an image photographed by a fully celestial camera capable of photographing an object corresponding to a visual field (an angle of view) of 360 degrees in the horizontal direction (a horizontal angle or an azimuth) and 210 degrees in the vertical direction centered on a zenith is a type of a VR image. In other words, an image having a video range corresponding to a field of view of 180 degrees (±90 degrees) or more in both the vertical direction and the horizontal direction and having a video range wider than a range that can be viewed at one time by a human being is a type of a VR image. By performing VR display of the VR image, changing an orientation in a horizontal rotation direction enables an omnidirectional video without any seams in the horizontal direction (the horizontal rotation direction) to be viewed. In the vertical direction (a vertical rotation direction), although an omnidirectional video without any seams can be viewed in a range of ±105 degrees with respect to directly above (the zenith), a range exceeding 105 degrees from directly above constitutes a blank region in which a video is not present. A VR image can be described as "an image of which a video range is at least a part of a virtual space (a VR space)".

VR display refers to a display method of displaying a video of a visual field range in accordance with an orientation of the electronic device 100 detected by the orientation detecting unit 113 among a VR image and in which a display range can be changed. When viewing the electronic device 100 mounted to VR goggles, a video of a visual field range in accordance with an orientation of the head of the user is to be displayed. For example, let us assume that a video with a viewing angle (an angle of view) centered on 0 degrees in the horizontal direction (a specific azimuth such as north)

and 90 degrees in the vertical direction (90 degrees from the zenith or, in other words, horizontal) at a certain point in time in a VR image is being displayed. When front and back of the orientation of the electronic device 100 is reversed from this state (for example, when a display surface is changed from facing south to facing north), the display range is changed to a video with a viewing angle centered on 180 degrees in the horizontal direction (an opposite azimuth such as south) and 90 degrees in the vertical direction (horizontal) in the same VR image. This means that, in a case where the user is viewing the electronic device 100 mounted to VR goggles, when the user turns his or her head toward south from north (in other words, when the user turns around), the video displayed on the electronic device 100 also changes from a northward video to a southward video). Such VR display enables the user to be provided with a sensation as though the user is visually present inside the VR image (inside the VR space).

Figure 4:
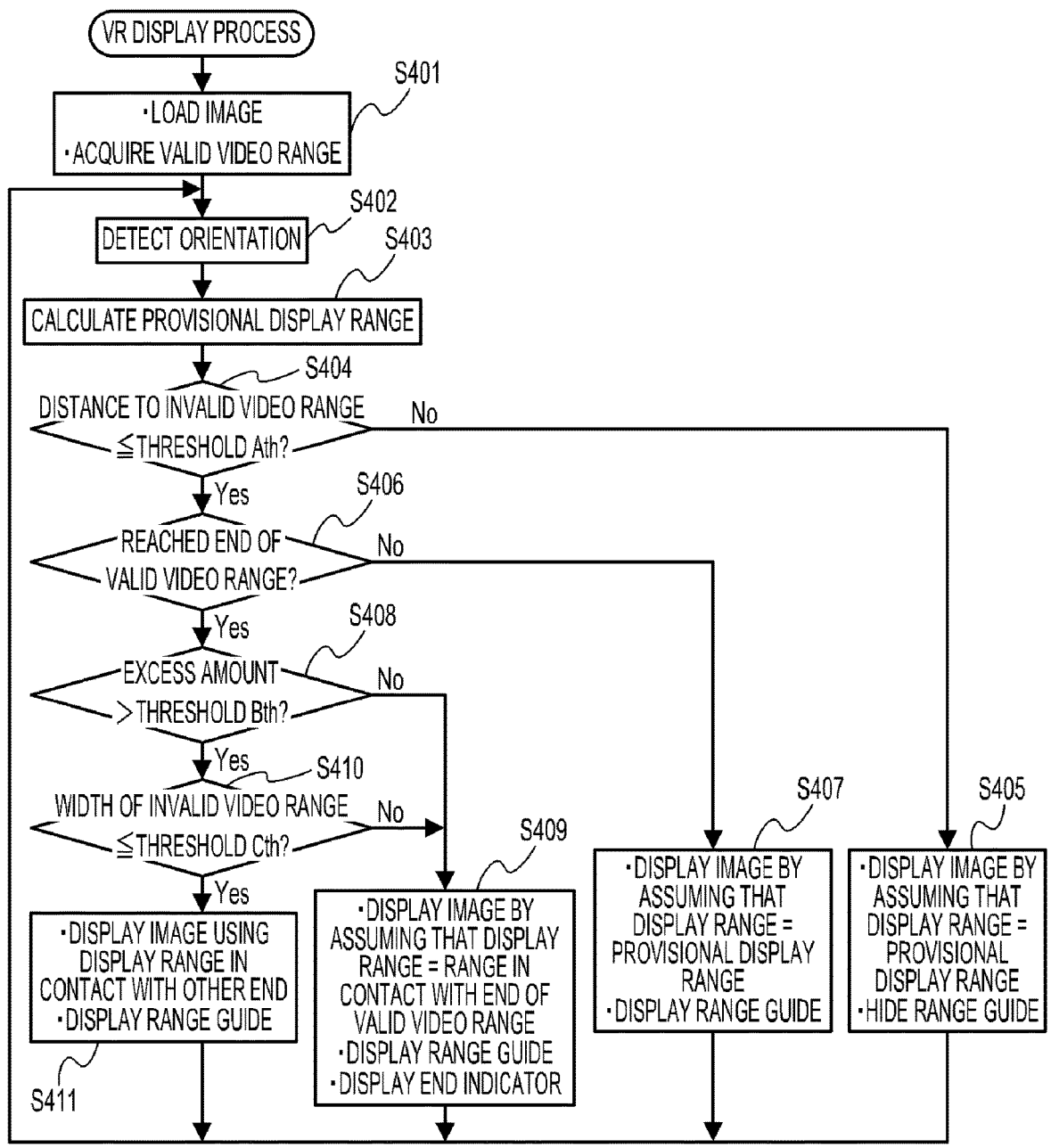
FIG. 4 is a flow chart of a VR display process.

FIG. 4 shows a flow chart of a VR display process performed by the electronic device 100. This process is realized as the CPU 101 deploys a program recorded in the nonvolatile memory 103 on the memory 102 and executes the program. The process shown in FIG. 4 is started when the power supply of the electronic device 100 is turned on, a VR image (a VR content) is selected from images recorded on the storage medium 108 and images acquired from a communication destination, and display by VR display among a plurality of display methods is designated.

In S401, the CPU 101 loads a VR image to be a display target from the storage medium 108 or a communication destination via the communication I/F. In addition, the CPU 101 acquires information indicating a video range (a valid video range) attached as attribute information of the VR image. The information indicating a valid video range refers to information describing angular ranges in the vertical direction and in the horizontal direction of a valid video included in the VR image. The information indicating a valid video range need only be information that enables a valid video range of the VR image to be specified and may be angle information represented by an angle of view, a viewing angle, an azimuth, an elevation, a depression angle, an elevation angle, a steradian, or the like or positional information such as the numbers of vertical and horizontal pixels or coordinates. Alternatively, the information indicating a valid video range may be model information of the camera used to capture the VR image (a photographable range can be specified by specifying a model), information on zoom during photography, and the like. When the CPU 101 acquires the information indicating a valid video range, the CPU 101 also identifies (calculates) an invalid video range (a non-video range) based on differences from vertical and horizontal 360 degrees. Conversely, information indicating an invalid video range may be acquired from the attribute information of the VR image and a valid video range may be calculated from the information indicating the invalid video range, or both information indicating a valid video range and information indicating an invalid video range may be acquired from the attribute information of the VR image.

In S402, the CPU 101 acquires an orientation (information on orientation) detected by the orientation detecting unit 113.

In S403, on the basis of the orientation acquired in S402, the CPU 101 calculates, on a provisional basis, a display range indicating a range to be displayed among the VR image (calculates a provisional display range). In the subsequent processes, a determination is to be made as to whether or not a video of the provisional display range calculated in S403 should actually be displayed.

Figure 5:
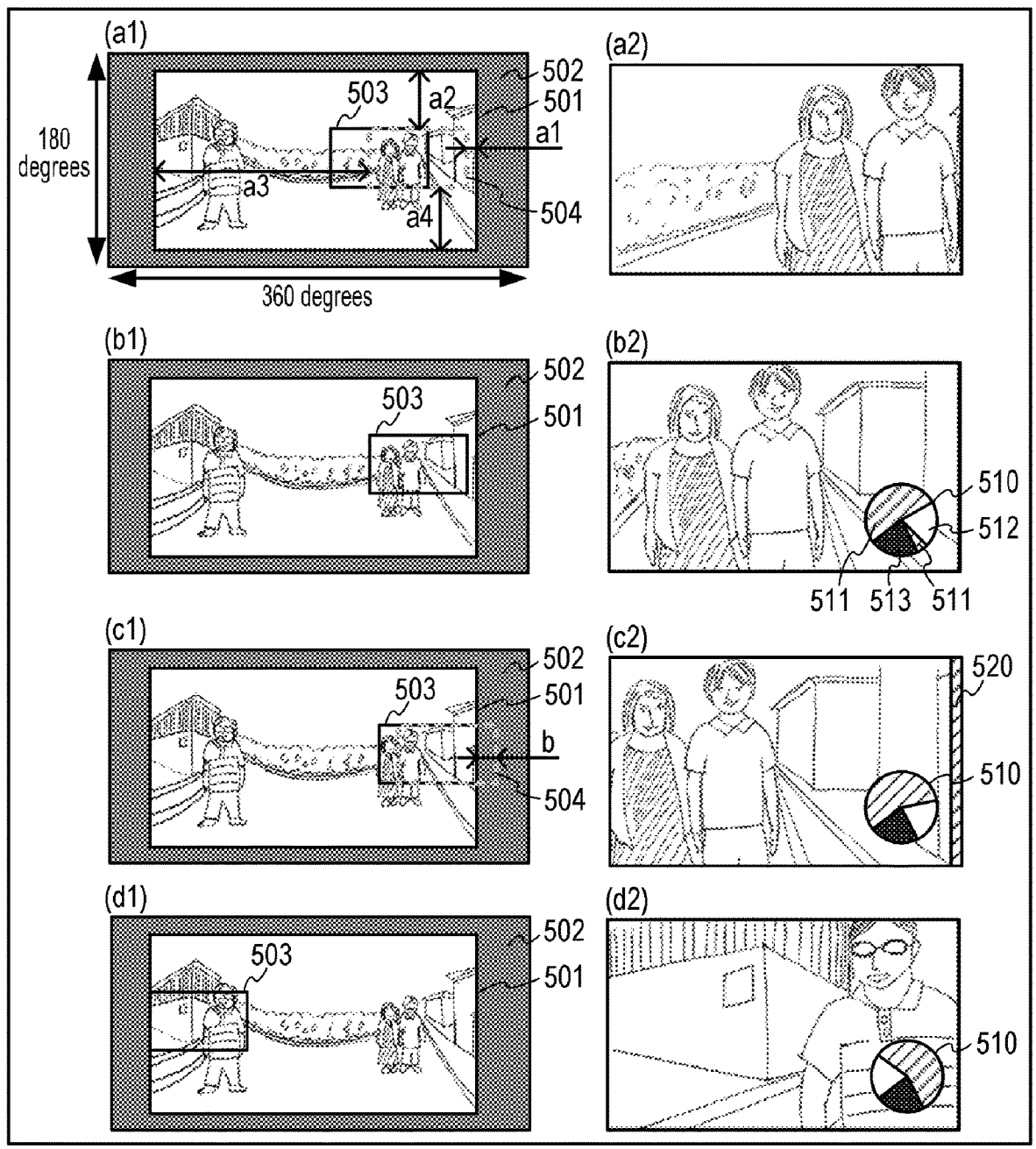
FIG. 5 shows a positional relationship and a display example of a display range in the VR display process.

In S404, the CPU 101 determines whether or not a distance from the provisional display range to the invalid video range is within a predetermined distance (within a predetermined amount) which is a threshold. When the distance is within the predetermined distance, the process advances to S406, but when the distance is greater than the predetermined distance, the process advances to S405. The process of S404 will be described with reference to FIG. 5(a1). In FIG. 5(a1), a valid video range 501 represents an entire valid video range in a VR image being mapped on a two-dimensional plane. An invalid video range 502 shown in gray indicates a region that is not the valid video range (a non-video range) in the VR image among an entire horizontal range (all directions) of 360 degrees and a vertical range of 180 degrees. This region does not include a video and an attempt to display the region results in monochromatically displaying the region as a blank region in black, gray, or the like. A display range 503 indicates a range that is currently being displayed (prior to orientation change) on the display 105 among the VR image. When the display range 503 is at a position shown in FIG. 5(a1), a display such as that shown in FIG. 5(a2) is performed on the display 105. A provisional display range 504 represents an angle of view having been moved by an amount of change in orientation detected by the orientation detecting unit 113 from the display range 503. The distance from the provisional display range to the invalid video range as determined in S404 includes the following values.

A distance a1 between a right end of the provisional display range 504 and a right end of the valid video range 501

A distance a2 between an upper end of the provisional display range 504 and an upper end of the valid video range 501

A distance a3 between a left end of the provisional display range 504 and a left end of the valid video range 501

A distance a4 between a lower end of the provisional display range 504 and a lower end of the valid video range 501

It should be noted that an end of the valid video range 501 is a portion in contact with a boundary between the valid video range 501 and the invalid video range 502. When any of the distances a1 to a4 is equal to or shorter than a distance Ath that is a threshold, the process advances to S406, but otherwise the process advances to S405. The threshold Ath is, for example, a length that is approximately 30% of a width of the display range 503 in a transverse direction, and any of the distances a1 to a4 being equal to or shorter than the threshold Ath indicates that an end of the valid video range will be reached shortly if the display range is further moved in a same direction. While an example of comparing a distance with a threshold has been described as the process of S404 because a two-dimensional plan view is used in the example, the process of S404 is not limited thereto. A determination as to whether or not ends of a provisional display range 504 and the valid video range 501 have approached each other need only be made, and an angular difference between an angle indicating the end of the valid video range 501 and an angle indicating the end of the provisional display range 504 may be compared with a threshold. In addition, while an example in which all of the distances a1 to a4 are compared to the distance Ath that is a threshold has been described, this example is not restrictive. For example, only a shortest distance among the distances a1 to a4 may be compared with the distance Ath, and the process may advance to S406 when the shortest distance is equal to or shorter than the distance Ath but otherwise the process may advance to S405. Furthermore, in accordance with a movement direction from the display range 503 prior to the orientation change to the provisional display range 504 calculated after the orientation change, a distance in a direction in which the end of the provisional display range 504 separates from the end of the valid video range among the distances a1 to a4 may not be used for the determination. In the illustrated example, the distance a3 may not be compared with the threshold Ath. Moreover, instead of comparing all of the distances a1 to a4 with the same threshold, each of the distances a1 to a4 may be compared with different thresholds. For example, the distances a1 and a3 in the horizontal direction may be compared with a distance Ath1, and the process may advance to S406 when the distances a1 and a3 are equal to or shorter than the distance Ath1. The distances a2 and a4 in the vertical direction may be compared with a distance Ath2 (<Ath1), and the process may advance to S406 when the distances a2 and a4 are equal to or shorter than the distance Ath2. Otherwise, the process may advance to S405. Accordingly, in the subsequent processes, in a case of a change in orientation in the horizontal direction that is a direction in which a person can more readily turn his or her head, the user's attention is called earlier than in a case of a change in orientation in the vertical direction to the fact that the display range is about to reach an end of the valid video range.

In S405, the CPU 101 updates the display range to the provisional display range calculated in S403 and displays a video of the updated display range on the display 105. In addition, since this situation is a case where the distance to the invalid video range is not determined to be within the predetermined distance in S404, a range guide is not displayed. When the range guide has been displayed prior to the change in orientation, the CPU 101 hides the range guide. The range guide will be described later.

FIG. 5(a1) shows a positional relationship of the display range 503 in a VR image in the situation of S405, and FIG. 5(a2) shows a display example in this case. The provisional display range 504 illustrated in FIG. 5(a1) is an example of a provisional display range that is calculated when there is a further clockwise change in orientation from a display range 503 displayed in S405. Therefore, in S405, it is assumed that the provisional display range 504 at the position illustrated in FIG. 5(a1) has not been acquired. The distance between the right end of the display range 503 and the right end of the valid video range 501 is greater than the threshold Ath and is a large distance (a similar description applies to the other distances). FIG. 5(a2) is a display example in a case where VR display of a position corresponding to the display range 503 in FIG. 5(a1) is performed on the display 105. Since a range guide 510 (to be described later) is not displayed, visual recognition of the VR image is not hindered.

In S406, the CPU 101 determines whether or not any of the ends (sides) of the provisional display range 504 has reached one end of the valid video range. In other words, this is a determination as to whether or not any of the distances a1 to a4 has become zero. When any of the ends (sides) of the provisional display range 504 has reached the one end of the valid video range, the process advances to S408, but otherwise the process advances to S407.

In S407, the CPU 101 updates the display range to the provisional display range calculated in S403 and displays a video of the updated display range on the display 105. In addition, since this situation is a case where the distance to the invalid video range is determined to be within the predetermined distance in S404, the CPU 101 displays a range guide as a notification of the fact that the distance to the invalid video range is now within the predetermined distance.

FIG. 5(b1) shows a positional relationship of the display range 503 in a VR image in the situation of S407, and FIG. 5(b2) shows a display example in this case. The display range 503 has moved further to the right from FIG. 5(a1), and although the display range 503 has not reached an end of the valid video range 501, the distance between the right end of the display range 503 and the right end of the valid video range 501 is equal to or shorter than the threshold Ath and is a short distance. FIG. 5(b2) is a display example in a case where VR display of a position corresponding to the display range 503 in FIG. 5(b1) is performed on the display 105. The range guide 510 is displayed superimposed on the VR display of an image. The range guide 510 indicates, among a circumference of 360 degrees, a valid video range (a hatched section 511), a display range (a white section 512) of which VR display is currently being performed, and an invalid video range (a black section 513). By viewing the range guide 510, the user can recognize which range (positional relationship) in the entire VR image is the currently-displayed range (display range). In the example shown in FIG. 5(b2), the white section 512 is near the black section 513, thereby indicating that the invalid video range is to be reached shortly if the line of sight (the display range) is moved further rightward.

The range guide 510 in FIG. 5(b2) shows a valid video range, an invalid video range, and a display range among 360 degrees in the horizontal direction. In addition, a range guide showing a valid video range, an invalid video range, and a display range among 360 degrees or 180 degrees in the vertical direction may be separately displayed. In other words, both the range guide 510 for the horizontal direction and a range guide for the vertical direction may be displayed. Furthermore, since displaying both range guides hinders visual recognition of the image of which VR display is performed, the range guide 510 for the horizontal direction and the range guide for the vertical direction may be dynamically switched in accordance with a direction of an immediately-previous change in orientation so as to display one of the range guides or display neither of the range guides. For example, when the distance a1 or the distance a3 which is a direction in the horizontal direction between the display range 503 and the valid video range 501 becomes equal to or shorter than the threshold Ath due to an immediately-previous change in orientation, the range guide 510 for the horizontal direction may be displayed and the range guide for the vertical direction may be hidden. In addition, when the distance a2 or the distance a4 which is a direction in the vertical direction between the display range 503 and the valid video range 501 becomes equal to or shorter than the threshold Ath due to an immediately-previous change in orientation, the range guide for the vertical direction may be displayed and the range guide 510 for the horizontal direction may be hidden. Accordingly, the user can comprehend a positional relationship of a range (a display range) currently being viewed with respect to a direction in which an end of a valid video range is almost reached. Alternatively, a component in the horizontal direction and a component in the vertical direction of a movement vector from an immediately-previous orientation may be compared with each other and a range guide of a larger movement component may be displayed.

In S408, the CPU 101 determines whether or not an amount by which the provisional display range 504 exceeds the valid video range 501 is greater than a threshold Bth (a predetermined amount). FIG. 5(c1) shows an example of a positional relationship in a case where the provisional display range 504 exceeds the valid video range 501. In S408, the CPU 101 determines whether or not a distance b which represents an amount by which the provisional display range 504 exceeds the valid video range 501 is greater than the threshold Bth. When the distance b exceeds the threshold Bth, the process advances to S410, but otherwise the process advances to S409. The amount by which the provisional display range 504 exceeds the valid video range 501 (an excess amount from an end of the valid video range 501) more specifically refers to the following.

When the right end of the provisional display range 504 exceeds the right end of the valid video range 501 (in other words, when a1<0): the distance between the right end of the provisional display range 504 and the right end of the valid video range 501

When the upper end of the provisional display range 504 exceeds the upper end of the valid video range 501 (in other words, when a2<0): the distance between the upper end of the provisional display range 504 and the upper end of the valid video range 501

When the left end of the provisional display range 504 exceeds the left end of the valid video range 501 (in other words, when a3<0): the distance between the left end of the provisional display range 504 and the left end of the valid video range 501

When the lower end of the provisional display range 504 exceeds the lower end of the valid video range 501 (in other words, when a4<0): the distance between the lower end of the provisional display range 504 and the lower end of the valid video range 501

The threshold Bth is a variable determined by a width of the invalid video range (a width of the valid video range) and is assumed to be a sum of the width of the invalid video range and a width of the display range in a movement direction of the display range. In other words, when the excess amount reaches the threshold Bth, the provisional display range becomes a range in contact with an exactly opposite-side end of the valid video range.

In S408, while a determination is made as to whether or not an amount by which the provisional display range 504 exceeds the valid video range 501 is greater than the threshold Bth (a predetermined amount), this is equivalent to determining whether or not an amount of change in orientation exceeds a threshold. In other words, the determination is equivalent to determining whether or not a change in the orientation of the electronic device 100 in a specific rotation direction from a state where the display range 503 is in contact with an end of the valid video range 501 has occurred in a change amount that causes the excess amount to reach Bth. A change in the orientation in the specific rotation direction is a change that causes the provisional display range 504 to move in a direction where the provisional display range 504 exceeds the valid video range. Therefore, the determination of S408 may be a determination made on the basis of orientation.

In S409, the CPU 101 updates the display range to a range in contact with an end of the valid video range 501 in a direction to the provisional display range calculated in S403 from the display range prior to movement instead of the provisional display range calculated in S403. In addition, the CPU 101 displays a video of the updated display range among the VR image on the display 105. Furthermore, since this situation is a case where the distance to the invalid video range is determined to be within the predetermined distance in S404, the CPU 101 displays a range guide.

FIG. 5(c1) shows a positional relationship of the display range 503 in a VR image in the situation of S409, and FIG. 5(c2) shows a display example on the display 105 in this case. The display range 503 has moved further rightward from FIG. 5(b1) and has reached an end of the valid video range 501, and the right end of the display range 503 and the right end of the valid video range 501 are in contact with each other. While the provisional display range 504 extends outside of the valid video range 501 as shown in FIG. 5(c1) due to an immediately-previous change in orientation of the electronic device 100, the display range 503 is set to a range in contact with the right end of the valid video range 501 instead of the provisional display range 504. In other words, even if the user changes the orientation of the electronic device to move the display range 503 rightward, the display range 503 temporarily stops at a position where the display range 503 abuts against the right end of the valid video range 501 and the display range does not move further unless determinations of Yes are made in S408 and S410. For example, when the user is viewing the electronic device 100 being mounted to VR goggles, the display range can be moved rightward (a right side of the VR image can be viewed) by turning the user's head to the right. However, the movement of the display range (a leftward-scroll of the video) temporarily stops upon the display range reaching the right end of the valid video range, and the display range does not change even if the user's head is turned further to the right unless determinations of Yes are made in S408 and S410.

FIG. 5(c2) is a display example in a case where VR display of a position corresponding to the display range 503 in FIG. 5(c1) is performed on the display 105. The range guide 510 is displayed superimposed on the VR display of an image. In the range guide 510, the white section indicating a display range is in contact with the black section indicating an invalid video range, thereby enabling the fact that the display range has reached an end of the valid video range to be recognized. In addition, the CPU 101 displays an end indicator 520 on a right side of FIG. 5(c2) which corresponds to a right side that is a side in contact with the valid video range 501 among four sides of the display range 503. The end indicator 520 is a semi-transmissive or non-transmissive display object that is displayed in a region along an end of a VR image of which VR display is being performed (an end of a display region of the display 105). The end indicator 520 signifies that at least a part of a side on which the end indicator 520 is displayed has reached an end of the valid video range. By looking at the end indicator 520, in the example shown in FIG. 5(c2), the user can recognize that there is no video even when the display range is moved further rightward. Furthermore, as described above, even when the orientation of the electronic device 100 is changed, the movement of the display range (a leftward-scroll of the video) temporarily stops at an end of the valid video range. In this case, when only the displayed video (image) is viewed, there is a possibility that the user may misinterpret that the movement of the display range has stopped due to some kind of process abnormality such as frame dropping due to insufficient processing capability or a failure. In addition, even if the movement of the display range is not temporarily stopped at an end of the valid video range, it is difficult for the user to determine whether display of a blank region is due to inclusion of an invalid video range or due to an occurrence of a region of which a part cannot be displayed because of some kind of abnormality in the display process. However, since the end indicator 520 is displayed in this case in the present embodiment, the user can correctly recognize that the display of the blank region is not a process abnormality but a normal operation that occurs due to the display range reaching an end of the valid video range. Furthermore, since a blank state corresponding to the invalid video range is not displayed (a black section or the like that is unrelated to the valid video range is not displayed), quality of VR display can be maintained at a high level. Displaying a blank state (displaying a black section or the like that is unrelated to the valid video range) has a risk of diminishing the sensation of virtual reality of a viewer of the blank state and may inhibit the sense of immersion of the user. Conversely, in the present embodiment, since a region corresponding to an invalid video range is not displayed even when the invalid video range is present, the sense of immersion can be prevented from being inhibited.

It should be noted that the notification displayed when the display range reaches an end of the valid video range is not limited to displaying the end indicator 520. In accordance with the display range reaching an end of the valid video range, a display form of the range guide 510 may be changed (by flickering display or changing colors), a message such as "you have reached the end" may be displayed, or other display items may be displayed (for example, a notification icon may be displayed). In addition, the fact that an end of the valid video range has been reached may be notified by not displaying the range guide 510 until the display range reaches the end of the valid video range and displaying the range guide 510 once the display range reaches the end of the valid video range. From the perspective of preventing the sense of immersion of the user from being inhibited, a notification by changing the display form of the range guide or displaying another display item that does not cover one side is more suitable than displaying a display object that covers one side such as the end indicator 520. Furthermore, since the fact that the display range has reached an end of the valid video range can also be recognized by the range guide 510, an additional display object such as the end indicator 520 may not be displayed just because an end has been reached. Conversely, from the perspective of explicitly notifying a reason for stopping the movement of the display range, the end indicator 520 may be displayed and the display of the end indicator 520 may be changed in accordance with an excess amount of the provisional display range from the valid video range such as the larger the excess amount, the larger an area of the end indicator 520. An excess of the provisional display range occurs in a case where the display range reaches an end of the valid video range and an instruction to change the display range to a region exceeding the end is further issued (an instruction due to an orientation change, a user operation, or the like). In addition, the notification that an end is reached such as the end indicator 520 may not be performed simply upon the display range reaching an end of the valid video range but may be performed when the provisional display range exceeds the end of the valid video range or, in other words, when there is a change in orientation so as to display a region exceeding the end. In this case, when the orientation does not change and is stable even when the display range has reached an end of the valid video range, a notification that the end is reached by the end indicator 520 or the like is not performed.

In S410, the CPU 101 determines whether or not a width of the invalid video range in a movement direction to the provisional display range calculated in S403 from the display range prior to the movement is narrower than a threshold Cth (a specific amount). While the width of the invalid video range can be expressed by the number of pixels, a length, or a distance when the VR image is mapped to a two-dimensional plane, the width of the invalid video range can also be expressed by angle information in the form of an angle of view, a viewing angle, an azimuth, an elevation, a depression angle, an elevation angle, a steradian, or the like. Therefore, the threshold Cth used in the determination of S410 may be a threshold Cth of the number of pixels, a length, or a distance or a threshold Cth of angle information. For example, the threshold Cth is assumed to be a width of the display range in the movement direction. When the width of the invalid video range is narrower than the threshold Cth, the process advances to S411, but otherwise the process advances to S409.

Figure 6:
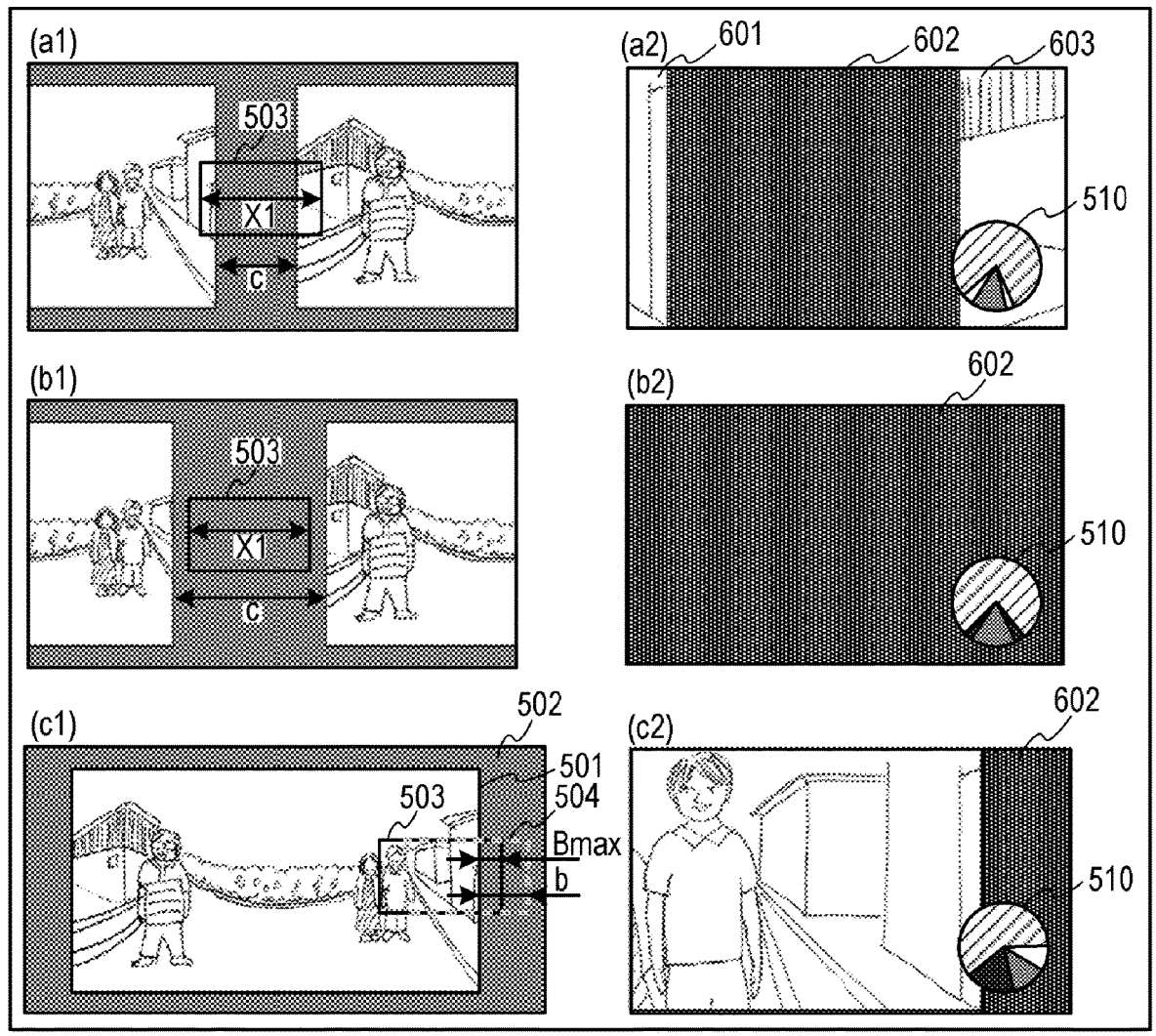
FIG. 6 shows a positional relationship and a display example of a display range in the VR display process.

FIG. 6(*a*1) and FIG. 6(*b*1) show a width of the invalid video range when the movement direction of the display range is rightward and a comparative example of a width of the display range as an example of the threshold Cth. FIG. 6(*a*1) and FIG. 6(*b*1) both illustrate a VR image mapped onto a two-dimensional plane with the invalid video range as a center. FIG. 6(*a*1) and FIG. 6(*b*1) differ from each other in a valid video range in the horizontal direction of the VR images, and the VR image shown in FIG. 6(*a*1) is assumed to have a wider valid video range (a narrower invalid video range) than the VR image shown in FIG. 6(*b*1). A width c in FIG. 6(*a*1) and FIG. 6(*b*1) represents a width (a length) in the horizontal direction of the invalid video range. In FIG. 6(*a*1), the width c in the horizontal direction of the invalid video range is narrower than a width X1 (=Cth) in the horizontal direction of the display range 503. Therefore, supposing that a range corresponding to the display range 503 shown in FIG. 6(*a*1) is displayed on the display 105, as shown in FIG. 6(*a*2), at least a part of the valid video range is displayed and a situation where an entire screen becomes a blank region does not occur. In this case, a determination of Yes is made in S410. On the other hand, in FIG. 6(*a*2), the width c in the horizontal direction of the invalid video range is wider than the width X1 (=Cth) in the horizontal direction of the display range 503. Therefore, supposing that a range corresponding to the display range 503 shown in FIG. 6(*b*1) is displayed on the display 105, as shown in FIG. 6(*b*2), the entire screen becomes a blank region. In this case, a determination of No is made in S410.

When a determination of No is made in S410, the process does not advance to S411 and the display range does not move to an opposite end of the valid video range no matter how much the provisional display range is moved rightward. In other words, no matter how much the user changes the orientation of the electronic device 100 in a same direction, the opposite end of the valid video range is not displayed. In order to display the opposite end of the valid video range, the orientation of the electronic device 100 must be changed in an opposite direction. In terms of an example of the case where the electronic device 100 is mounted to VR goggles, the display range does not exceed a right end of the valid video range no matter how much the head is turned to the right. In order to view a region on a left side of the valid video range, the head must be turned to the left. The reason for this is, since the width of the invalid video range in the horizontal direction is wide, continuity (relevance) of videos on a right side and a left side of the valid video range on either side of the invalid video range is low. For example, a further right side of an object shown at a right end of the valid video range (in the example shown in FIG. 6(*b*1), a building with white walls) is not shown at a left end of the valid video range and is cut off. In this case, switching display from a range of the right end to a range of the left end of the valid video range in accordance with an orientation change involving turning the head to the right results in displaying a video with a low relevance ((in the example shown in FIG. 6(b1), a different building) to the object shown at the right end of the valid video range. When the user views such a display change, there is a possibility that the user cannot realize that the displayed video of the range of the left end of the variation amount is a video of a further right side of the video of the range of the right end having been immediately previously viewed by the user and may feel a sense of discomfort such as a reduced sense of immersion. Therefore, in the present embodiment, when the width of the invalid video range in the movement direction is wide, the display range is not changed from the one end to the opposite end of the valid video range. While an example in which an amount corresponding to the width of the display range is used as the threshold Cth has been described, an amount corresponding to a fixed angle such as an amount corresponding to 270 degrees or an amount corresponding to 180 degrees may be used instead. In addition, the width of the valid video range may be used as the threshold Cth such as comparing the width of the invalid video range with the width of the valid video range and preventing the display range from exceeding an end of the valid video range when the width of the invalid video range is wider.

In S411, the CPU 101 updates the display range to a range in contact with an end on an opposite side to the end with which the display range prior to movement had been in contact among the valid video range, and displays a video of the updated display range among the VR image on the display 105. When a sum of the width of the invalid video range and the width of the display range in the movement direction is used as the threshold Bth, the range in contact with the end on the opposite side to the end with which the display range prior to movement is equivalent to a provisional display range set with an excess amount equal to the threshold Bth. Furthermore, since this situation is a case where the distance to the invalid video range is determined to be within the predetermined distance in S404, the CPU 101 displays a range guide.

FIG. 5(d1) shows a positional relationship of the display range 503 in a VR image in the situation of S411, and FIG. 5(d2) shows a display example on the display 105 in this case. While the display range 503 has been in contact with the right end of the valid video range 501 in FIG. 5(c1), as a result of an orientation change in which the orientation of the electronic device 100 causes the display range to be moved further rightward, in FIG. 5(d1), the display range 503 has become a range in contact with a left end (an opposite end to the right end) of the valid video range 501. FIG. 5(d2) is a display example in a case where VR display of a position corresponding to the display range 503 in FIG. 5(d1) is performed on the display 105. The range guide 510 is displayed superimposed on the VR display of an image. In the range guide 510, the white section indicating a display range is in contact with the black section indicating an invalid video range in a reverse positional relationship with respect to the example shown in FIG. 5(c2), thereby enabling the fact that the display range has moved to an opposite end of the valid video range to be recognized. In addition, the end indicator 520 is not displayed. This is because the immediately-previous change in orientation was not a change that causes the display range to move in a direction where the left end of the valid video range is exceeded.

An animation display which informs that the display range has moved to the opposite end of the valid video range may be performed at some point after a determination that the excess amount has exceeded the threshold Bth is made in S408 and before the display of FIG. 5(d2) is performed in S411. For example, as shown in FIG. 6(a2), a display may be performed such that a video 601 of the display range prior to movement, a blank region 602, and a video 603 of the display range after the movement are quickly moved (scrolled) to the left and the video 603 of the display range after the movement appears by moving from the right. Interjecting such a display enables the user to more easily recognize that the display range has moved to the opposite end. It should be noted that, at this point, since the display range passes the invalid video range, the display range overlaps with the invalid video range in the range guide 510. The overlapped range is displayed in a display form which enables the overlapped range to be distinguished from a non-overlapping range (in the illustrated example, the overlapped range is displayed in gray which is neither white nor black).

According to the VR process described above, when the user changes the orientation of the electronic device to move the display range 503 to the right, the display range 503 moves in a sequence of FIG. 5(a1), FIG. 5(b1), FIG. 5(c1), and FIG. 5(d1). In this movement process, while the display range changes smoothly in accordance with the change in orientation from FIG. 5(a1), FIG. 5(b1), to FIG. 5(c1), the movement of the display range is temporarily stopped from FIG. 5(c1) to FIG. 5(d1) even when the orientation change continues. Subsequently, at a time point where the excess amount of the provisional display range reaches the threshold Bth, the display range 503 moves from FIG. 5(c1) to FIG. 5(d1).

While an example in which the range guide 510 is displayed in a case where the display range is within a predetermined distance from an end of the valid video range has been described in the VR display process described above, alternatively, the range guide 510 may be displayed when the invalid video range is present in the VR image that is a display target but hidden when the invalid video range is not present. In other words, switching between displaying and hiding the range guide 510 may be performed in accordance with whether or not an invalid video range is present in the VR image that is a display target.

In addition, while an example in which the range guide 510 is displayed in a case where the display range is within a predetermined distance from an end of the valid video range has been described in the VR display process described above, alternatively, the range guide 510 may be displayed regardless of whether or not the display range is within a predetermined distance from an end of the valid video range. In other words, the range guide 510 may be displayed even when the display range is separated from an end of the valid video range by more than the predetermined distance. When displaying the range guide 510 even when the display range is separated from an end of the valid video range by more than the predetermined distance, it is more favorable to notify that the display range has approached an end of the valid video range by another method in accordance with the display range moving to within a predetermined distance from the end. For example, a display item other than the range guide 510 such as an icon, a message, or a symbol may be displayed in accordance with the display range moving to within a predetermined distance from an end of the valid video range. Alternatively, in accordance with the display range moving to within a predetermined distance from an end of the valid video range, the display form of the originally displayed range guide 510 may be changed from a first display form to a second display form (for example, by blinking or changing color).

Furthermore, in the VR display process described above, an example has been described in which, when the display range reaches an end of the valid video range, the fact that the display range has reached the end is notified by holding the display range in a state where the display range is in contact with the end and subsequently displaying the end indicator 520. However, this example is not restrictive and, instead of the process of S409, the fact that an end of the valid video range has been reached may be notified by moving the display range beyond the end of the valid video range up to a part of the invalid video range but not displaying the invalid video range by more than a predetermined amount (an amount corresponding to Bmax to be described later).

FIG. 6(*c*1) shows a positional relationship between the valid video range and the display range in this case. FIG. 6(*c*1) represents an example of a positional relationship in a situation where there is an orientation change of the electronic device 100 and the excess amount b of the provisional display range 504 from the valid video range 501 has exceeded a maximum width Bmax of the invalid video range included in the display range 503. FIG. 6(*c*2) is a display example of VR display on the display 105 in a case where the display range 503 is at a position shown in FIG. 6(*c*1). Until the provisional display range 504 exceeds the maximum width Bmax, the display range is updated by a range in accordance with the provisional display range including the invalid video range and a video of the updated display range is displayed. A blank region (a region exceeding an end of the valid video range) corresponding to the invalid video range included in the display range is displayed by filling the blank region with a single color or the like. In other words, in accordance with an orientation change of the electronic device 100, a blank region with a width in accordance with an amount of orientation change is displayed until the provisional display range 504 exceeds the maximum width Bmax. When the provisional display range 504 exceeds the maximum width Bmax, instead of displaying the display range in accordance with the provisional display range, the display range is held in a range where the maximum width Bmax is not exceeded as shown in FIG. 6(*c*1) and a range where the excess amount from the valid video range 501 is the maximum width Bmax is displayed as the display range 503. It is assumed that the maximum width Bmax is set to a smaller value than the width of the display range 503. When the excess amount b of the provisional display range 504 from the valid video range 501 has exceeded the maximum width Bmax of the invalid video range included in the display range 503 but is yet to exceed the threshold Bth, the display range 503 shown in FIG. 6(*c*1) is retained and a display such as that shown in FIG. 6(*c*2) is performed. Such a display enables the user to intuitively understand that a region exceeding an end of the currently-displayed video is a blank region and that a video is not present in the blank region. At this point, since the display range partially overlaps with the invalid video range, the display range overlaps with the invalid video range in the range guide 510. The overlapped range is displayed in a display form which enables the overlapped range to be distinguished from a non-overlapping range (in the illustrated example, the overlapped range is displayed in gray which is neither white nor black). When the excess amount b of the provisional display range 504 from the valid video range 501 exceeds Bth, the process described earlier is performed.

While an example in which the range guide is displayed in a case where the display range is within a predetermined distance from an end of the valid video range has been described in the VR display process described above, alternatively, the range guide may be displayed when at least a part of the display range includes an invalid video range. Setting of a display range that only includes the invalid video range (a display range that does not include the valid video range) may be allowed such as when the maximum width Bmax described above is wider than the width of the display range. In such a case, the range guide may be displayed in accordance with the entire display range becoming the invalid video range.

While an example in which the range guide 510 indicates a valid video range, a display range, and an invalid video range has been described in the VR display process described above, alternatively, the display range need not be indicated. As long as the valid video range and the invalid video range are indicated, the user can recognize that a display of a blank region is due to the invalid video range and is not a process abnormality.

Modifications

A VR display process shown in FIG. 7 may be performed in place of the VR display process described with reference to FIG. 4. The VR display process shown in FIG. 7 omits the processes of S408 and S411 in FIG. 4 but additionally includes S711 instead.

Processes of S401 to S409 are similar to those described with reference to FIG. 4. When it is determined in S406 that the provisional display range has reached an end of the valid video range, the process of S410 is performed.

In S410, the CPU 101 determines whether or not a width of the invalid video range is narrower than the threshold Cth. When the width of the invalid video range is narrower than the threshold Cth, the process advances to S711, but when the width of the invalid video range is equal to or wider than the threshold Cth, the process advances to S409.

In S409, the CPU 101 performs a process similar to the process described with reference to FIG. 4. In other words, the display range does not become a range exceeding an end of the valid video range and a range exceeding the end (the invalid video range) is not displayed in the VR display.

In S711, the CPU 101 updates the display range to the provisional display range calculated in S403 and displays a video of the updated display range on the display 105.

In this situation, the display range includes the invalid video range that is a range exceeding an end. Therefore, in this case, display such as that shown in FIG. 6(*c*2) and FIG. 6(*a*2) is performed.

Figure 7:
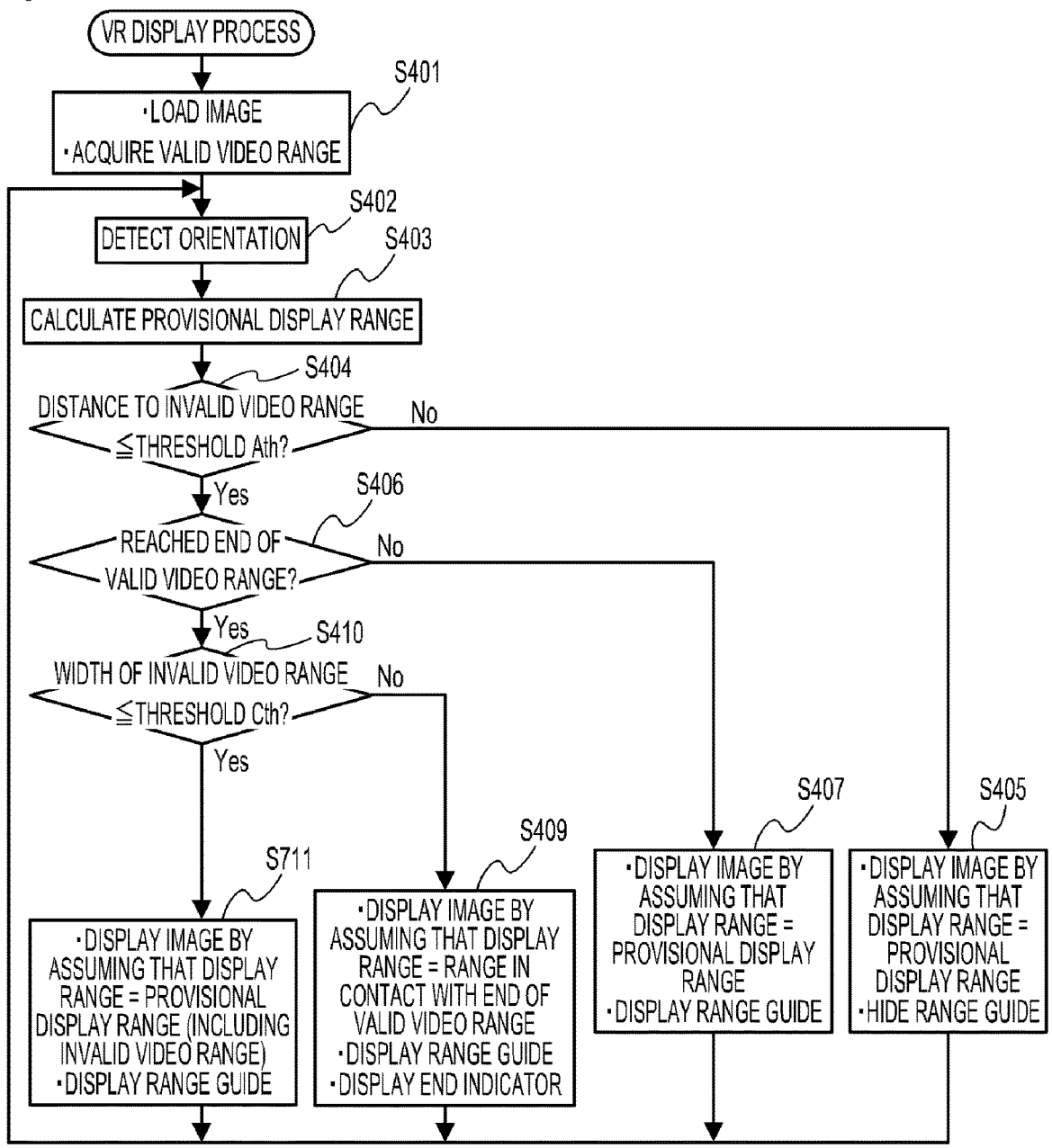
FIG. 7 is a flow chart of another example of the VR display process.

According to the VR display process shown in FIG. 7, when the width of the invalid video range is narrower than the threshold Cth, the movement of the display range does not step even when there is an orientation change in which the provisional display range exceeds an end of the valid video range. According to the VR display process shown in FIG. 7, in such a case, the display range can be smoothly moved to the valid video range at an opposite end via a display of a blank region. On the other hand, when the width of the invalid video range is equal to or wider than the threshold Cth and when the provisional display range reaches an end of the valid video range, the movement of the display range stops even when there is a further orientation change in a same direction. As described above, the VR display process shown in FIG. 7 differs in that, in accordance with whether or not the width of the invalid video range is narrower than the threshold Cth, either a blank region exceeding an end of the display range is displayed or the display range is stopped without displaying the blank region.

Accordingly, for example, the user wearing VR goggles and viewing the electronic device 100 notices that the display range does not move even though the user is turning his or her head to the right, quickly realizes that a range beyond the display range will not be displayed even by further turning his or her head, and stops turning his or her head to the right. Specifically, the user realizes that a range beyond the display range will not be displayed at a time point where his or her head has been further turned about 10 degrees after the display range has stopped, and stops turning his or her head to the right. Therefore, a futile rotating operation of the head (for example, an operation of rotating the head by a further 90 degrees after the display range has stopped) can be prevented from being performed.

In a case where a center of the valid video range becomes a display range when the electronic device 100 is mounted to VR goggles and the user faces the front, a center of the invalid video range is to be behind the user. When the invalid video range is narrow (when the width of the invalid video range is narrower than the threshold Cth), there is also a valid video range behind the user and it is worthwhile for the user to turn around. However, when the invalid video range is wide (when the width of the invalid video range is equal to or wider than the threshold Cth), since there is no valid video range behind the user, it makes little sense to the user to turn around. In addition, in order to view diagonally backward left where the opposite end of the valid video range is displayed from a state of viewing diagonally backward right where the right end of the valid video range is displayed, it is easier for the structure of the human body to move the line of sight by turning to the left via the front than to turn backward and further moving the line of sight to the right. Therefore, when the invalid video range is wide and it makes little sense to turn backward as in the process described with reference to FIG. 7, the movement of the display range is promptly stopped to guide the user so as not to turn further backward. Accordingly, operations which are difficult to carry out such as turning backward can be prevented from being performed in vain and VR display can be viewed in a comfortable manner.

In the embodiment described above, an example of performing monocular VR display in which an image of one display range is displayed one at a time on a single screen has been described as an example of VR display. However, VR display is not limited to monocular VR display. The present invention is also applicable to binocular VR display in which one display range is displayed in two display regions on a single screen or two display ranges having been slightly offset in consideration of parallax are respectively displayed in two display regions on a single screen.

In addition, in the embodiment described above, while an example of applying the present invention to VR display in which a display range is moved on the basis of an orientation of the electronic device 100 as detected by the orientation detecting unit 113 has been described, the present invention is not limited thereto. The present invention is also applicable to a case where, instead of moving the display range on the basis of orientation, the display range is moved on the basis of a scroll instruction operation by the user. For example, in another display mode that differs from a VR display mode, the display range can be moved (scrolled) not in accordance with a change in orientation but in accordance with a touch-move with respect to the touch panel 106a by the user or an operation with respect to a directional button such as an arrow key. Even in this case, a provisional display range can be obtained in accordance with the scroll instruction operation and the processes of S404 to S411 in FIG. 4 or the processes of S404 to S711 in FIG. 7 described above can be performed. In other words, even when the display range is moved by a touch-move, when the display range approaches or reaches an end of the valid video range, the fact that the display range has approached or reached the end is notified. Furthermore, although the display range can be scrolled beyond an end of the valid video range by a touch-move when the width of the invalid video range is narrower than a predetermined width, a movement of the display range by a touch-move does not result in exceeding the end of the valid video range when the width of the invalid video range is equal to or wider than the predetermined width.

According to the processes described above, when the display range reaches an end of the valid video range of a VR image from a position that does not include the end, control is performed so that the range guide 510 or the end indicator 520 is displayed. As a result, it can be recognized that the reason for the display range not moving further is that the display range has reached an end of the valid video range. Therefore, a false recognition that the reason is another factor such as a decline in processing capability due to high-load processing, a process abnormality, or a failure can be prevented from being made.

In addition, according to the processes described above, control is performed so that the display range can be changed beyond an end of the valid video range to an opposite end when a width of the invalid video range is narrower than a predetermined width but the display range is prevented from moving beyond the end of the valid video range when the width of the invalid video range is equal to or wider than the predetermined width. As a result, when the invalid video range is narrow a video of the opposite end of the valid video range can be displayed by a small change in orientation. On the other hand, when the invalid video range is wide, the user can be prevented from being forced to make a difficult change in orientation such as turning backward and further moving the line of sight by a large amount.

In a VR content containing a video of a wider range than a human viewing angle, a non-video range is often positioned to the rear or directly underneath when a center of the valid video range is assumed to be a front surface and positioned in a direction in which it is difficult for a user directly facing the center of the valid video range to direct his or her line of sight. However, in order to display the valid video range at another end after displaying the non-video range beyond one end, the non-video range must be displayed for a long period of time when the non-video range is wide. Displaying the non-video range for a long period of time requires that a posture in which it is difficult to direct a line of sight be assumed for a long period of time and makes it difficult to discern which range is being displayed. Rather, moving the display range in an opposite direction and displaying the valid video range at the other end may make it easier to discern which range is being displayed and, at the same time, may be performed more easily. According to the present embodiment, since the display range does not move beyond an end of the valid video range when the width of the invalid video range is equal to or wider than a predetermined width, the user tries to have the valid video range of the other end displayed by moving a display direction in an opposite direction. In this manner, a situation where displaying the non-video range for a long period of time forces a posture in which it is difficult to direct a line of sight to be assumed for a long period of time and a situation where it is difficult to discern which range is being displayed can be suppressed. In this manner, a more suitable display can be performed after reaching an end of a video range included in a VR content.

The various controls described above as controls to be performed by the CPU 101 may be carried out by one piece of hardware, or a plurality of pieces of hardware may control an entire apparatus by sharing processes.

In addition, while the present invention has been described in detail based on a preferred embodiment thereof, the present invention is not limited to the specific embodiment and various modes that does not constitute departures from the scope of the invention are also included in the present invention. Furthermore, the embodiment described above simply represents an example of the present invention and the embodiment can also be combined with other embodiments.

Moreover, while an example in which the present invention is applied to the electronic device 100 which is a smartphone or the like has been described in the embodiment presented above, the present invention is not limited to this example and can be applied to any electronic device capable of performing control so as to display a portion of a VR image. Obviously, in addition to a smartphone, the present invention can also be applied to a head mounted display (HMD). In addition, the present invention can be applied to a personal computer, a PDA, a mobile phone terminal, a mobile image viewer, a printer apparatus equipped with a display, a digital photo frame, and the like. Furthermore, the present invention can be applied to a music player, a game device, an electronic book reader, a tablet terminal, a smartphone, a projection apparatus, an electric home appliance or a car-mounted apparatus equipped with a display, and the like.

According to the present disclosure, when a content having a wide video range contains a non-video range, a more suitable display can be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic device comprising:
a processor; and
a memory storing a program which, when executed by the processor, causes the electronic device to:
detect an orientation of the electronic device; and
perform control to display a part of a content in accordance with the detected orientation, on a screen,
wherein the orientation of the electronic device can be changed by more than an angle of view of the content,
if the angle of view of the content is more than a predetermined degrees, after the displayed part of the content reaches one end of the content in accordance with the detected orientation in a specific direction, the displayed part of the content is changed from the one end to another end of the content in accordance with a further orientation change detected in the specific direction, and
if the angle of view of the content is less than the predetermined degrees, after the displayed part of the content reaches one end of the content in accordance with the detected orientation in a specific direction, the displayed part of the content is not changed from the one end to another end of the content in accordance with a further orientation change detected in the specific direction.

2. The electronic device according to claim 1, wherein the program when executed by the processor further causes the electronic device to perform control to display indicating that the displayed part of the content has reached the one end, after the displayed part of the content reaches the one end of the content in accordance with the detected orientation in the specific direction.

3. The electronic device according to claim 1, wherein the program when executed by the processor further causes the electronic device to perform control to display an item representing a relationship between the detected orientation and a position of the displayed part of the content.

4. The electronic device according to claim 1, wherein the content has been edited such that the angle of view of the content is less than the predetermined degrees if the angle of view of the content is less than the predetermined degrees.

5. The electronic device according to claim 1, wherein the angle of view of the content depends on a type of an image capturing apparatus which generates the content.

6. The electronic device according to claim 1, wherein the content is displayed in a single region or a plurality of regions on the screen.

7. A control method of an electronic device, comprising:
detecting an orientation of the electronic device; and
performing control to display a part of a content in accordance with the detected orientation, on a screen, wherein the orientation of the electronic device can be changed by more than an angle of view of the content, if the angle of view of the content is more than a predetermined degrees, after the displayed part of the content reaches one end of the content in accordance with the detected orientation in a specific direction, the displayed part of the content is changed from the one end to another end of the content in accordance with a further orientation change detected in the specific direction, and if the angle of view of the content is less than the predetermined degrees, after the displayed part of the content reaches one end of the content in accordance with the detected orientation in a specific direction, the displayed part of the content is not changed from the one end to another end of the content in accordance with a further orientation change detected in the specific direction.

8. A non-transitory computer readable medium that stores a program, wherein the program causes a computer to execute a control method of an electronic device, comprising:

detecting an orientation of the electronic device; and performing control to display a part of a content in accordance with the detected orientation, on a screen, wherein the orientation of the electronic device can be changed by more than an angle of view of the content, if the angle of view of the content is more than a predetermined degrees, after the displayed part of the content reaches one end of the content in accordance with the detected orientation in a specific direction, the displayed part of the content is changed from the one end to another end of the content in accordance with a further orientation change detected in the specific direction, and if the angle of view of the content is less than the predetermined degrees, after the displayed part of the content reaches one end of the content in accordance with the detected orientation in a specific direction, the displayed part of the content is not changed from the one end to another end of the content in accordance with a further orientation change detected in the specific direction.

9. An electronic device comprising:

a processor; and a memory storing a program which, when executed by the processor, causes the electronic device to:

detect an operation by a user; and perform control to display a part of a content in accordance with the detected operation, on a screen, wherein the operation can instruct to be changed by more than an angle of view of the content, if the angle of view of the content is more than a predetermined degrees, after the displayed part of the content reaches one end of the content in accordance with the detected operation in a specific direction, the displayed part of the content is changed from the one end to another end of the content in accordance with a further operation change detected in the specific direction, and if the angle of view of the content is less than the predetermined degrees, after the displayed part of the content reaches one end of the content in accordance with the detected operation in a specific direction, the displayed part of the content is not changed from the one end to another end of the content in accordance with a further operation change detected in the specific direction.

10. The electronic device according to claim 9, wherein the screen is installed with a touch sensor and the operation is a touch-move.

11. The electronic device according to claim 9, wherein the program when executed by the processor further causes the electronic device to perform control to display indicating that the displayed part of the content has reached the one end, after the displayed part of the content reaches the one end of the content in accordance with the detected operation in the specific direction.

12. The electronic device according to claim 9, wherein the program when executed by the processor further causes the electronic device to perform control to display an item representing a relationship between the detected operation and a position of the displayed part of the content.

13. The electronic device according to claim 9, wherein the content has been edited such that the angle of view of the content is less than the predetermined degrees if the angle of view of the content is less than the predetermined degrees.

14. The electronic device according to claim 9, wherein the angle of view of the content depends on a type of an image capturing apparatus which generates the content.

15. The electronic device according to claim 9, wherein the content is displayed in a single region or a plurality of regions on the screen.

16. A control method of an electronic device, comprising:

detecting an operation by a user; and performing control to display a part of a content in accordance with the detected operation, on a screen, wherein the operation can instruct to be changed by more than an angle of view of the content, if the angle of view of the content is more than a predetermined degrees, after the displayed part of the content reaches one end of the content in accordance with the detected operation in a specific direction, the displayed part of the content is changed from the one end to another end of the content in accordance with a further operation change detected in the specific direction, and if the angle of view of the content is less than the predetermined degrees, after the displayed part of the content reaches one end of the content in accordance with the detected operation in a specific direction, the displayed part of the content is not changed from the one end to another end of the content in accordance with a further operation change detected in the specific direction.

17. A non-transitory computer readable medium that stores a program, wherein the program causes a computer to execute a control method of an electronic device, comprising:

detecting an operation by a user; and performing control to display a part of a content in accordance with the detected operation, on a screen, wherein the operation can instruct to be changed by more than an angle of view of the content, if the angle of view of the content is more than a predetermined degrees, after the displayed part of the content reaches one end of the content in accordance with the detected operation in a specific direction, the displayed part of the content is changed from the one end to another end of the content in accordance with a further operation change detected in the specific direction, and if the angle of view of the content is less than the predetermined degrees, after the displayed part of the content reaches one end of the content in accordance with the detected operation in a specific direction, the displayed part of the content is not changed from the one end to another end of the content in accordance with a further operation change detected in the specific direction.

18. An electronic device comprising:
a detector configured to detect an orientation of the electronic device; and
at least one memory and at least one processor which function as a display controlling unit configured to perform control so as to display a range of a part of a VR content as a display range on a display, and configured to change a position of the display range in accordance with an orientation detected by the detector, wherein
when a part of the VR content is a non-video range and the non-video range is narrower than a specific amount, after the display range reaches one end of a video range of the VR content in the video range in accordance with an orientation change in a specific rotation direction of the electronic device, the display controlling unit changes the display range from the one end to another end of the video range in accordance with a further orientation change in the specific rotation direction of the electronic device, and
when a part of the VR content is a non-video range and the non-video range is not narrower than the specific amount, after the display range reaches one end of a video range of the VR content in the video range in accordance with an orientation change in the specific rotation direction of the electronic device, the display controlling unit does not change the display range from the one end to another end of the video range even when there is a further orientation change in the specific rotation direction of the electronic device.

19. A control method of an electronic device, comprising:
a detecting step of detecting an orientation of the electronic device; and
a display controlling step of performing control so as to display a range of a part of a VR content as a display range on a display, and changing a position of the display range in accordance with an orientation detected in the detecting step, wherein
when a part of the VR content is a non-video range and the non-video range is narrower than a specific amount, after the display range reaches one end of a video range of the VR content in the video range in accordance with an orientation change in a specific rotation direction of the electronic device, in the display controlling step, the display range is changed from the one end to another end of the video range in accordance with a further orientation change in the specific rotation direction of the electronic device, and
when a part of the VR content is a non-video range and the non-video range is not narrower than the specific amount, after the display range reaches one end of a video range of the VR content in the video range in accordance with an orientation change in the specific rotation direction of the electronic device, in the display controlling step, the display range is not changed from the one end to another end of the video range even when there is a further orientation change in the specific rotation direction of the electronic device.

20. A non-transitory computer readable medium that stores a program, wherein
the program causes a computer to execute a control method of an electronic device, comprising:
a detecting step of detecting an orientation of the electronic device; and
a display controlling step of performing control so as to display a range of a part of a VR content as a display range on a display, and changing a position of the display range in accordance with an orientation detected in the detecting step, wherein
when a part of the VR content is a non-video range and the non-video range is narrower than a specific amount, after the display range reaches one end of a video range of the VR content in the video range in accordance with an orientation change in a specific rotation direction of the electronic device, in the display controlling step, the display range is changed from the one end to another end of the video range in accordance with a further orientation change in the specific rotation direction of the electronic device, and
when a part of the VR content is a non-video range and the non-video range is not narrower than the specific amount, after the display range reaches one end of a video range of the VR content in the video range in accordance with an orientation change in the specific rotation direction of the electronic device, in the display controlling step, the display range is not changed from the one end to another end of the video range even when there is a further orientation change in the specific rotation direction of the electronic device.

21. An electronic device comprising at least one memory and at least one processor which function as:
a display controlling unit configured to perform control so as to display a range of a part of a VR content as a display range on a display, and configured to change a position of the display range in accordance with an operation by a user, wherein
when a part of the VR content is a non-video range and the non-video range is narrower than a specific amount, after the display range reaches one end of a video range of the VR content in the video range in accordance with a performance of a predetermined operation, the display controlling unit changes the display range from the one end to another end of the video range in accordance with a further performance of the predetermined operation, and
when a part of the VR content is a non-video range and the non-video range is not narrower than the specific amount, after the display range reaches one end of a video range of the VR content in the video range in accordance with a performance of the predetermined operation, the display controlling unit does not change the display range from the one end to another end of the video range even when there is a further performance of the predetermined operation.

22. A control method of an electronic device, comprising:
a display controlling step of performing control so as to display a range of a part of a VR content as a display range on a display, and changing a position of the display range in accordance with an operation by a user, wherein
when a part of the VR content is a non-video range and the non-video range is narrower than a specific amount, after the display range reaches one end of a video range of the VR content in the video range in accordance with a performance of a predetermined operation, in the display controlling step, the display range is changed from the one end to another end of the video range in accordance with a further performance of the predetermined operation, and when a part of the VR content is a non-video range and the non-video range is not narrower than the specific amount, after the display range reaches one end of a video range of the VR content in the video range in accordance with a performance of the predetermined operation, in the display controlling step, the display range is not changed from the one end to another end of the video range even when there is a further performance of the predetermined operation.

23. A non-transitory computer readable medium that stores a program, wherein the program causes a computer to execute a control method of an electronic device, comprising:

a display controlling step of performing control so as to display a range of a part of a VR content as a display range on a display, and changing a position of the display range in accordance with an operation by a user, wherein when a part of the VR content is a non-video range and the non-video range is narrower than a specific amount, after the display range reaches one end of a video range of the VR content in the video range in accordance with a performance of a predetermined operation, in the display controlling step, the display range is changed from the one end to another end of the video range in accordance with a further performance of the predetermined operation, and when a part of the VR content is a non-video range and the non-video range is not narrower than the specific amount, after the display range reaches one end of a video range of the VR content in the video range in accordance with a performance of the predetermined operation, in the display controlling step, the display range is not changed from the one end to another end of the video range even when there is a further performance of the predetermined operation.

* * * * *